United States Patent [19]

Boehm et al.

[11] Patent Number: 4,604,064
[45] Date of Patent: Aug. 5, 1986

[54] PORTABLE DEMONSTRATOR FOR ELECTRONIC EQUIPMENT

[75] Inventors: Douglas A. Boehm, Hoffman Estates; David M. Ylinen, Lake Zurich, both of Ill.

[73] Assignee: Motorola, Inc., Schaumburg, Ill.

[21] Appl. No.: 612,939

[22] Filed: May 22, 1984

[51] Int. Cl.⁴ .................................................. G09B 5/06
[52] U.S. Cl. .................................... 434/224; 434/379; 434/309
[58] Field of Search ............... 434/224, 379, 316, 308, 434/309

[56] References Cited

U.S. PATENT DOCUMENTS

| | | |
|---|---|---|
| 3,047,964 | 8/1962 | Fried . |
| 3,696,524 | 10/1972 | Kranyik et al. ................... 434/308 |
| 3,719,812 | 3/1973 | Bishop et al. ................... 235/151.31 |
| 3,803,728 | 4/1974 | Scott ................................... 434/308 |
| 4,019,183 | 4/1977 | Haynes ............................... 343/103 |
| 4,035,929 | 7/1977 | Groff .................................. 434/308 |
| 4,190,967 | 3/1980 | Ruegg et al. ..................... 434/308 |
| 4,281,994 | 8/1981 | Dell et al. ............................ 434/49 |
| 4,300,205 | 11/1981 | Tansuwan ........................ 364/578 |
| 4,310,884 | 1/1982 | Roberts et al. .................. 364/578 |
| 4,311,466 | 1/1982 | Carpenter et al. .............. 434/242 |
| 4,352,163 | 9/1982 | Schultz, Jr. et al. ............. 364/801 |

Primary Examiner—Leo P. Picard
Attorney, Agent, or Firm—Douglas A. Boehm; Donald B. Southard; Edward M. Roney

[57] ABSTRACT

A portable audio-visual demonstration apparatus which provides operational instruction and functional simulation or particularized electronic equipment for training and exhibition purposes is disclosed. The preferred embodiment of the invention is the application of the demonstration apparatus to communications equipment, specifically FM two-way mobile radios. This embodiment comprises: a plurality of actual radio control heads wherein all radio controls and functions are simulated to be fully operational; a display panel with overlying translucent forms which is illuminated to display the corresponding radio operational response; a tape deck which plays a cassette wherein voice instruction has been pre-recorded; and a portable hand-carried suitcase package which incorporates the above elements with its own power supply. An instructional "program" is thereby provided to train the operator through "hands-on" manipulation of radio controls as directed by the pre-recorded voice instruction and in response to a visual display of simulated radio operation.

15 Claims, 7 Drawing Figures

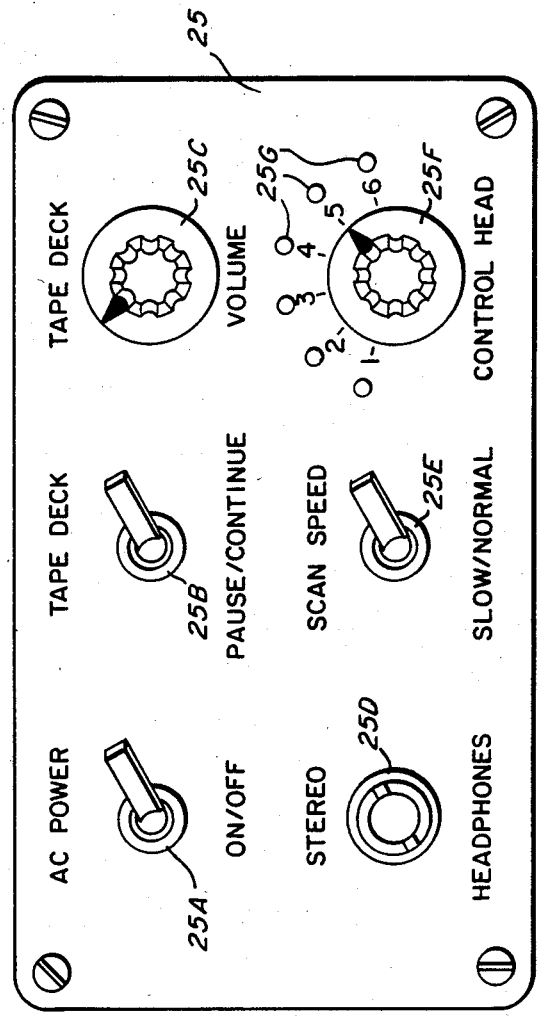

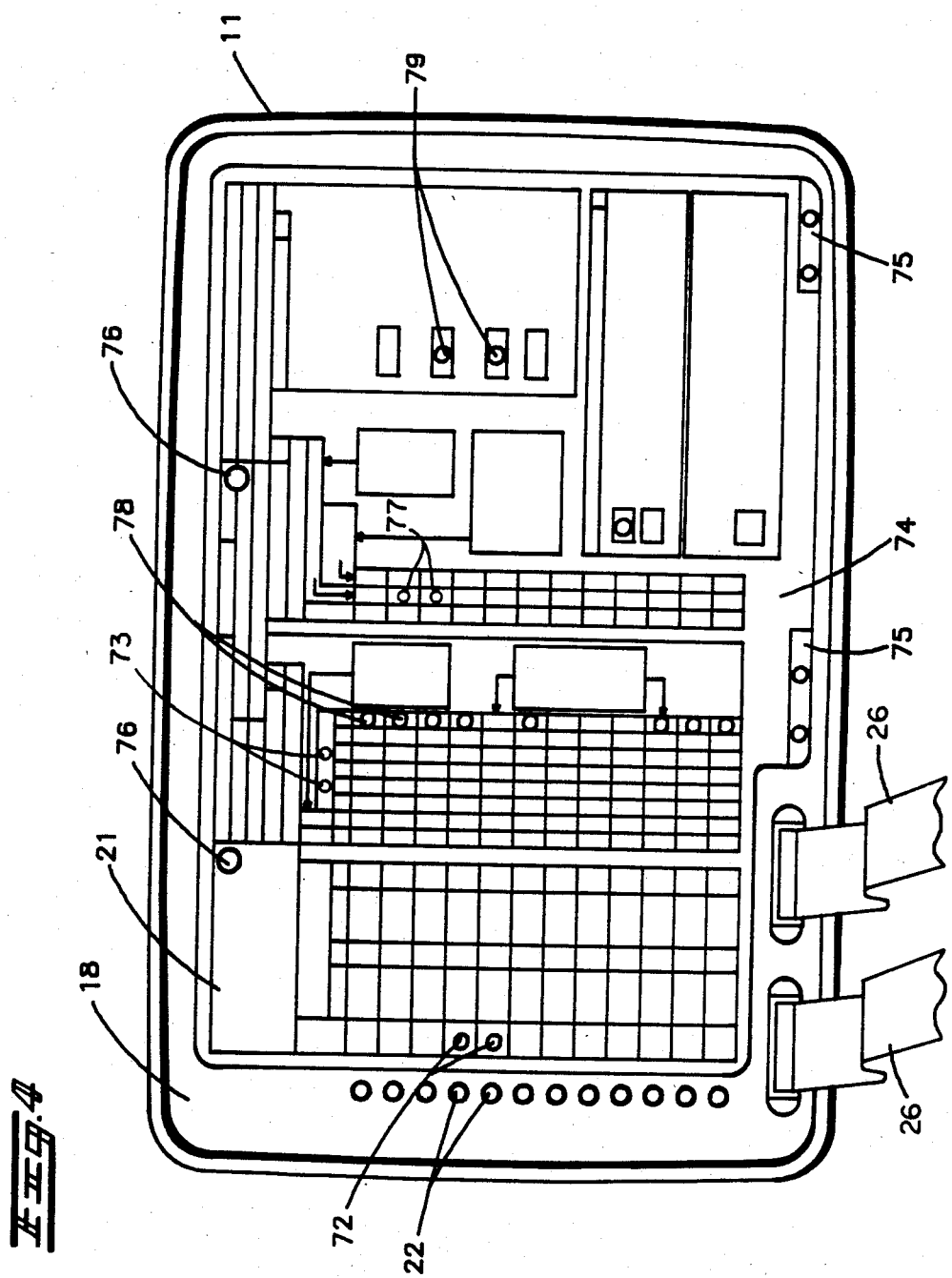

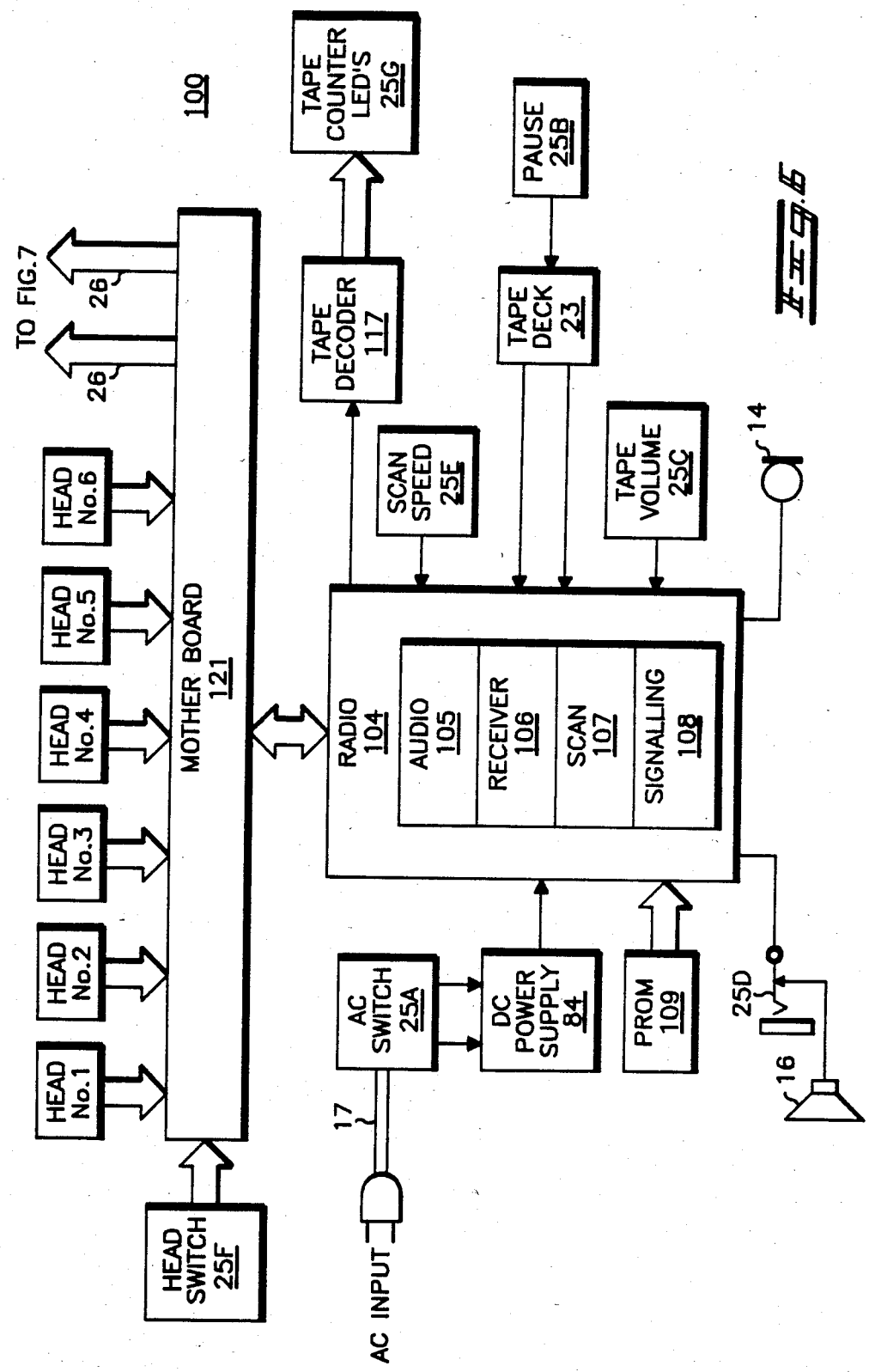

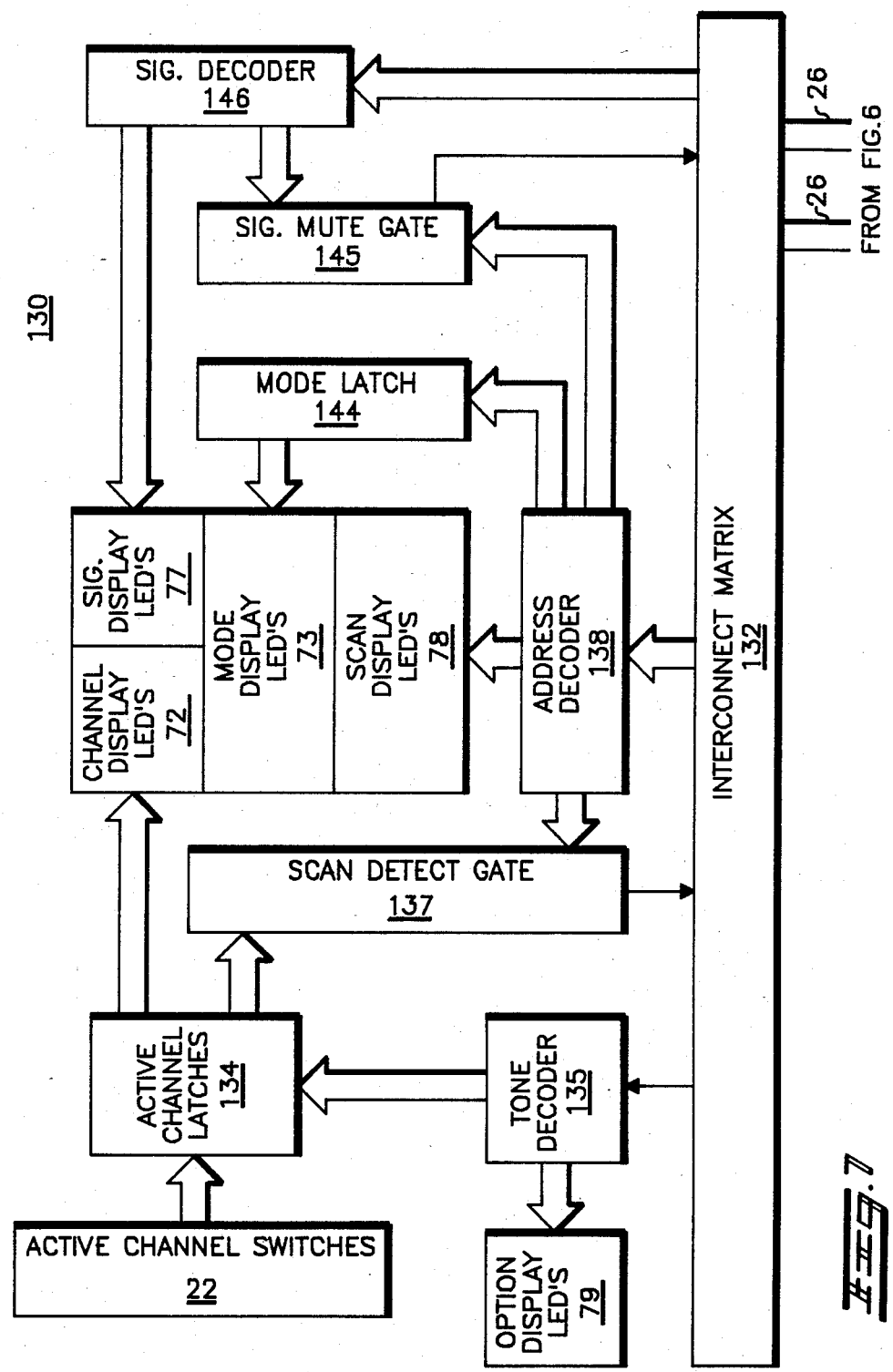

PORTABLE DEMONSTRATOR FOR ELECTRONIC EQUIPMENT

FIELD OF THE INVENTION

The present invention relates generally to equipment simulators, and, more particularly, to a portable demonstration device which provides operational instruction and functional simulation of particularized electronic equipment, such as for training and exhibition purposes.

DESCRIPTION OF THE PRIOR ART

With advancements in electronics miniaturization, a corresponding trend has become apparent in the electronic equipment industry toward substantial size and cost reduction. An obvious benefit of this trend is the introduction of numerous features and options which increase the versatility of the product. These advancements all too often give rise to operational complexity and unfamiliarity of the equipment. A representative example of such complex electronic equipment is the new generation of microcomputer-controlled FM two-way mobile radios—offering multiple-function operator controls, programmable frequency synthesizers, user-modifiable/spontaneous priority channel scanning, and intricate digital signalling schemes. This sophisticated equipment requires substantial time and effort to fully appreciate the flexibility as well as to fully understand the operation thereof. Thus, the problem arises of how to effectively educate the users of this equpment, specifically, the equipment salesmen, maintenance technicians, and customers.

Previous attempts to provide instructions on features, options, operation, and ordering procedures have not always proven effective in training the intended users. This conventional training material, such as users' manuals, study guides, order guides, and video presentations lack the "hands-on" (tactile) feedback necessary to fully understand the complicated radio functions. It has been noted that comprehension of the operation was greatly improved when actual working radios were used for demonstration purposes, but this approach introduced numerous additional obstacles such as: each radio must be re-programmed to a customer's actual system frequencies at each location; only one version of the radio could practicably be demonstrated at one site; the system's internal operation could only be verbally described; and functional demonstration of certain options (i.e., priority channel scanning) was totally dependent on the customer's actual system traffic. Furthermore, new order forms presented the salesmen with additional unfamiliar ordering procedures.

It has been further noted, in numerous educational situations, that a person may well learn faster and retain more when the information is presented to more than one of that person's senses. For example, salesmen presently employ verbal communication accompanied by a "hands-on" demonstration when introducing their product to customers. The customer is then presented with a considerable amount of information in a minimum amount of time through three different senses: sight, sound, and touch. When this approach is collectively organized by a training "program" (which provides a continuous learning direction) and contained in a portable package (for on-site instruction), it proves to be the optimum method of training users in the operation of the particularized electronic equipment.

Portable training and demonstration units are, of course, known generally in the communication electronics industry, yet all prior art training devices lack one or more of the aforementioned necessary elements. For example, Fried's "Simulated Functional-System Demonstrator," as described in U.S. Pat. No. 3,047,964, provides a single display panel to visually simulate the operation of the components of a dial-operated automatic channel selection system. This display panel approach is directed to represent schematic information by presenting visual and tactile feedback at the component level, but it obviously lacks any kind of "programmed" instruction to teach the user the particulars of the system. Furthermore, an instructor must be utilized to provide the vocal description.

More sophisticated training devices, such as Motorola's "MDC-600" signalling mobile demonstration kit, consists of a functional control unit contained in a portable suitcase. This "radio in a suitcase" concept is aimed at providing the critical element of "hands-on" training by simulating the radio's response to specific operator controls, but it still necessitates the use of a knowledgeable salesperson to provide the instructional format or "program" by means of verbal communication. Additionally, the internal system operation (directed to any level) is not understood by the user since there is no provision for a functional display.

A highly sophisticated training approach is taken in flight simulators, such as in Dell et al., U.S. Pat. No. 4,281,944, which describes an "Aircraft Simulator Digital Audio System" for providing mass voice storage and retrieval by means of digital processing. The flight simulator concept involves entire cockpit emulation, with fully-functional instrumentation, a digitally-stored communication system, and advanced motion systems to reproduce the actual sight, sound, and feel of the aircraft being simulated. A mass storage medium, such as a disk, bubble memory, large scale core memory, or semiconductor memory, is required to implement the audio system. Moreover, a multitude of digital computers are needed to control the audio, instrumentation, and motion systems. Although the flight simulator represents the ultimate in computer-automated training systems, it has obvious limitations with respect to portable applications. It will also be appreciated that the flight simulator "program" is designed to evaluate a student's response to a given situation, as presented by the supervising instructor. Thus, the instructor provides a particular flight situation (stimulus) and then monitors the student's performance (response). This "stimulus-response" type program format is limited to specific applications such as vehicle simulators, and would not prove advantageous for more universal education or demonstration purposes.

A need, therefore, exists for providing effective training and demonstration of sophisticated electronic equipment. The present invention is specifically directed to this need.

SUMMARY OF THE INVENTION

Accordingly, it is a general object of the present invention to provide a portable demonstration device to perform operational instruction and functional simulation of particularized apparatus, such as electronic equipment, for training and exhibition purposes.

Another object of the present invention is to incorporate portions, but nevertheless, actual functioning units of, the electronic equipment to be demonstrated, thereby utilizing the sense of touch.

A further object of the present invention is to incorporate a visual display to simulate operation of the electronic equipment, thereby utilizing the sense of sight.

Still another object of the present invention is to incorporate audio voice instruction in demonstrating the operation of the electronic equipment, thereby utilizing the sense of hearing.

A particular objective of the present invention is to provide an instructional "program" to sequentially present operational procedures and information through audio-visual means.

The present invention provides a portable audio-visual demonstration apparatus for simulating the operation of particularized electronic equipment, which includes one or more functional units, or representative portions thereof, duplicating the specific piece of electronic equipment to be demonstrated. This apparatus comprises the combination of: an audio reproduction device, such as a tape deck, to play pre-recorded voice instruction; a display panel, providing visual demonstration of the simulated operation in response of the electronic equipment; and a portable housing, such as a suitcase, containing the above elements. An instructional "program" is provided for teaching the operation of the electronic equipment by directing manipulations of equipment controls through voice instruction which cause corresponding operational responses in the visual display.

The particular embodiment of the present invention is the application of the portable demonstration apparatus to communications equipment, specifically, FM two-way mobile radios. Six functional radio control heads, representing different optional configurations, are provided along with the appropriate hand-held microphone and radio speaker. All operator controls are fully functional to simulate a customer's actual mobile radio installation. A cassette tape player is mounted next to the control heads to facilitate audio voice instruction. The pre-recorded cassette tape provided with each unit contains not only voice instruction, but inaudible tones to control the display. The visual display panel is located in the upper half of the unit. A translucent plastic sheet is placed over the display panel to format the LED (Light Emitting Diode) indicators according to the specific order form. All of the above elements are contained in a medium-sized suitcase to facilitate the portability requirement. The operational "program" is implemented by simply following the pre-recorded cassette tape verbal instructions describing the function of each individual control in a logical progression. As the operator performs the instructed control manipulations, the radio responds by illuminating LED's in the visual display; thus correlating control manipulations to radio operation in an ordering procedure format.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in connection with the accompanying drawings, in the several figures of which like referenced numerals identify like elements, and in which:

FIG. 2 is an enlarged planar view of the control panel of FIG. 1 in accordance with the present invention;

FIG. 3 is an enlarged representation of the six control heads of the portable demonstrator unit of FIG. 1 showing the location of the operator controls;

FIG. 4 is an enlarged planar view of the display panel of FIG. 1 illustrating the format of the LED display;

FIG. 6 is a detailed block diagram of the lower half of the portable demonstrator unit of the preferred embodiment of the present invention.

DETAILED DESCRIPTION OF THE INVENTION

Figure 1:
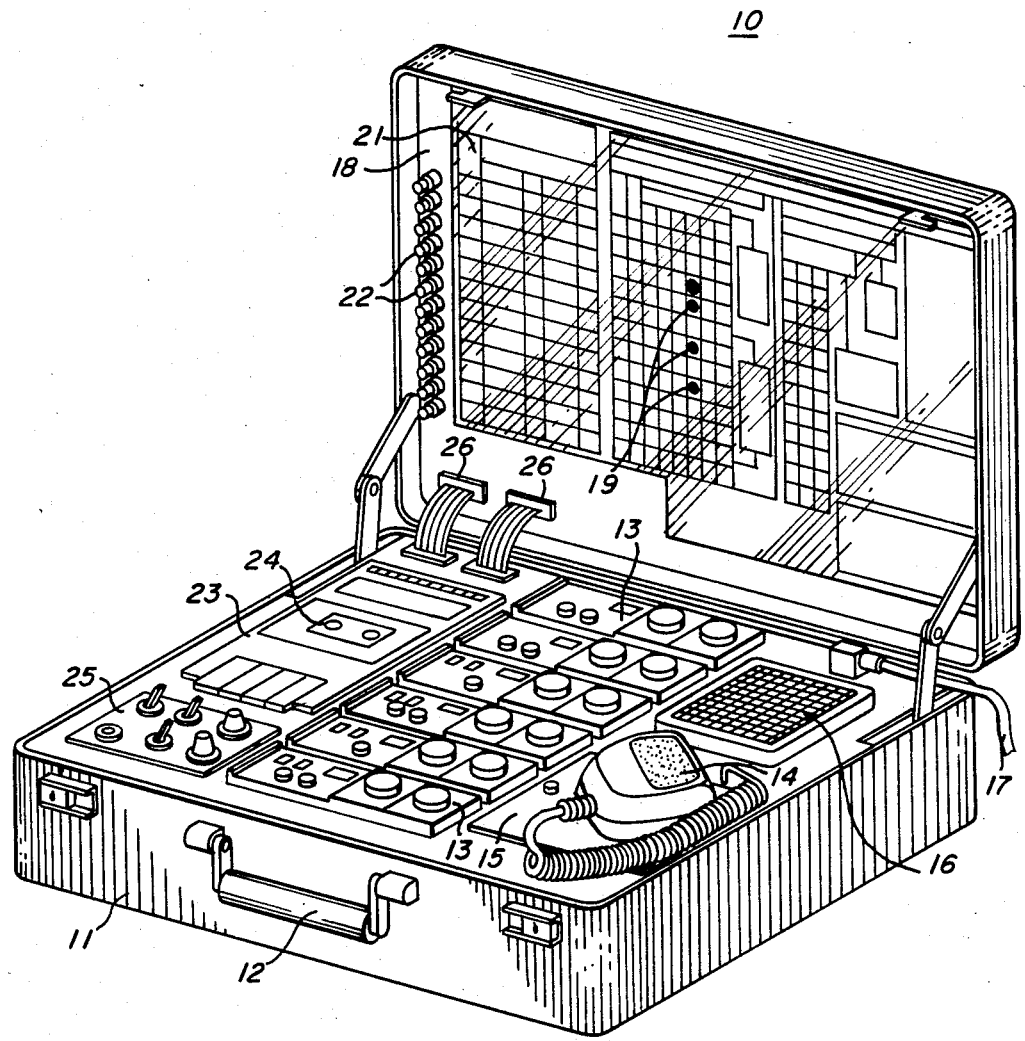
FIG. 1 is a perspective view of the portable demonstrator apparatus illustrating a preferred embodiment of the present invention.

The preferred embodiment of the present invention is directed to the application of the portable audio-visual demonstration apparatus to communications equipment. In particular, the invention may be advantageously utilized to train salesmen and customers in the features, options, and ordering procedures of a mobile transceiver unit, such as, for example the Motorola "MCX100" synthesized, microcomputer-controlled FM two-way radio. It will be appreciated, however, that the inventive concept of the portable demonstration apparatus is in no way limited to the mobile communications equipment field, as other applications could include portables, pagers, telephones, electronic instruments, stereos, computers, or any sophisticated electronic device that warrants such demonstration. Since the control head of the remote-mount version radio contains all of the operator controls, there was no need to include the entire trunk-mounted unit in each portable demonstrator. Thus, six actual "MCX100" radio control heads, of different option configurations, are mounted in the central portion of the lower half of the demonstrator. In this particular instance, six radio control heads could be configured to contain a majority of all available options offered—but the actual number of equipment units would generally depend upon the individual application requirements. These six control heads are totally functional when individually selected by the user, and they demonstrate basic radio functions (receive, transmit, volume, squelch, channel selection, etc.), as well as specific options (tone-coded squelch, time-out-timer, channel scanning, etc.). The user physically removes the microphone from the hang-up clip to transmit, and can actually hear receiver noise in the speaker. A tape deck is also mounted in the lower half of the unit to play a pre-recorded cassette tape of a given length which instructs the user in the operation and ordering procedures of the radio models and options. The stereo cassette provided has audible voice and music on track one, and inaudible control tones on track two which controls the visual display and tape counter. The tape counter is used to locate any desired section of the tape, and to inform the user which control head is being discussed. The upper half of the portable demonstrator contains the visual display panel, comprised of a clear plastic window which holds one of a plurality (in this case, six) enlarged translucent overlays (each corresponding to a particular control head) to the LED background. Channel selection (slaved to radio), scan display (controlled by scan microcomputer), and signalling options (controlled by the signalling option circuitry) are all represented by vertical columns of red LED's. Specific ordering information on each translucent order form is backlit by yellow LED's, which are controlled by the inaudible tones on the cassette tape. Green LED's are used to represent channel activity, which can be automatically controlled by the cassette tape, or manually controlled by the active channel switches located at the left edge of the order form. These twelve switches allow the user to manually simulate carrier activity on any of the radio channels to demonstrate the channel scan options. The entire portable demonstrator is housed in a medium-sized suitcase which includes an internal power supply. The instructional "program," which is contained on the pre-recorded cassette tape, is an important feature of the portable demonstrator device. The cassette "program" serves to correlate the audio, visual and tactile information presented by providing a continuous learning procedure through the use of step-by-step instructions. This audio instruction is organized in a logical progression to explain all six control heads, starting with the easiest, i.e. carrier squelch model (control head no. 1) through to the most complex tone-coded squelch priority channel scanner (control head no. 6). For example, the audio voice could instruct the user to change to channel 12 on head no. 4, press the scan control switch, and observe the appropriate channel scanning sequence in the display. Additionally, the cassette "program" may direct the user's attention to a particular order form location, when verbally explaining the details of that option, by illuminating the corresponding option number through the use of an inaudible control tone. Thus, instructional information is presented to three of the user's senses in such a manner as to facilitate a complete understanding of all radio operations and ordering procedures.

To operate the portable demonstration unit, the user simply opens the unit, attaches the AC power cord, switches on the AC power, plays the pre-recorded cassette tape, and follows the specific "hands-on" instructions of changing order forms and radio control manipulations. Since each of the six translucent order forms correlates to a particular control head, the audio instructions will prompt the user to remove the previous order form and attach the current order form before instruction proceeds. The user is free to utilize the cassette deck's fast-forward, rewind, play, stop, or pause controls to review a previously discussed option, or to locate a specific section of the tape. The control panel contains six red tape counter LED's, one of which illuminates whenever the tape is played, indicating which control head is presently being discussed. The cassette tape also controls the simulated carrier activity of the twelve channels in the visual display when demonstrating specific channel scanning features. Additionally, the portable demonstrator may be used in a manual mode to display radio functions for product shows, conventions, etc. In the manual mode, the tape deck is disabled such that the user (a salesman) may demonstrate a (customer's) particular model or option. Even in the manual mode, the display panel shows the actual radio operation by illuminating LED's through the appropriate transluscent order form. The user can visualize the radio scanning the chosen channels, and he can control the scanning by pressing an active channel switch to simulate carrier presence. In either the tape deck "program" mode, or the manual mode, the control heads appear to be fully functional—as observed by receiver noise, channel display, time-out-timer, volume control, squelch control, microphone operation, signalling sidetones, and optional channel scan functions. Furthermore, each portable demonstrator apparatus may be "customized" to a particular customer's application by replacing PROMs, substituting different control heads, supplying new order forms, or by providing a special cassette tape.

Some of the numerous advantages of the portable demonstrator of the present invention are to provide: (a) a "hands-on" training approach utilizing audio instruction with visual feedback to simulate actual equipment performance; (b) a comprehensive "personalized" instruction presented in a logical, step-by-step format; (c) a completely self-contained portable demonstration unit being independent of a customer's actual RF system traffic; (d) the capability to include a description of numerous optional features on a plurality of equipment models; (e) a substantial amount of information in a minimal amount of time through the use of concise audio instruction; (f) a visual display of the equipment's internal operation to facilitate a complete understanding of system details; (g) a basis for explaining complex ordering procedures through the use of a specific display format; (h) a flexible training approach through provisions for "customizing" each individual demonstrator; and (i) a device capable of both training a user and demonstrating equipment capabilities.

Referring now to the drawings, FIG. 1 is a perspective view of the preferred embodiment of the portable demonstrator apparatus 10, illustrating the application of the present invention to a Motorola "MCX100" FM two-way mobile radio. All of the elements of the demonstrator 10 are housed in a medium-sized suitcase 11, with carrying handle 12 to facilitate the hand-carried, portability requirement. Preferably, there is an internal AC-to-DC power supply located in the lower half of the suitcase, with the AC power cord 17 providing the required input voltage. If circumstances prevent the use of an external AC line input, such as at outdoor demonstrations, then an external 12-volt DC power supply may be connected via internal terminal posts (not shown) furnished for such purposes. Storage compartment 15 accommodates the AC power cord, radio microphone, and cassette tapes when the portable demonstrator 10 is not being used. Radio microphone 14 is normally placed in the hang-up clip mounted on the storage compartment door as shown for easy operator access. Radio speaker 16, mounted in the lower half of the demonstrator 10, provides an audio output for both the cassette tape deck and the radio audio itself. Six totally-functional radio control heads 13 are mounted in the central portion of the lower half to allow easy access for operator interface. A cassette tape deck 23 is flush-mounted in the upper left portion of the lower half of the suitcase 11 to facilitate the audio reproduction means of operator instruction. The standard play, stop, fast forward, and rewind buttons of the cassette deck allow the user total control of the cassette tape. The pre-recorded cassette tape 24 supplies verbal instructions to direct the operator in each particular radio control manipulation task, which in turn, creates the desired radio response. In addition to voice instruction, the cassette tape 24 contains musical segments during the intermission of selecting control heads and changing order forms. Control panel 25 provides the operator with the necessary demonstrator control functions which will subsequently be described in conjunction with FIG. 2. Interconnect cables 26 serve to link the lower half of the demonstrator 10 to the upper half.

The display panel 18 is located in the upper half of the suitcase to facilitate an upright display of radio functional operation. An enlarged translucent order form 21 is placed over the display to provide a format to assist in the understanding of radio ordering procedures. Numerous display LED's 19, controlled by both the radio itself and the cassette tape "program", illuminate the display by backlighting a particular location of the order form. These LED's serve to simulate radio operation, as well as orient the user to a specific option location of the order form as explained by the voice instruction. Active channel switches 22 allow the user the opportunity to simulate an active RF channel during a channel scan demonstration. (A more detailed description of the display panel follows in conjunction with FIG. 4.)

FIG. 2 is an enlarged planar view of the control panel 25 of FIG. 1 illustrating the function of the control panel switches. AC power switch 25a is used to turn the portable demonstrator off or on. The tape deck pause switch 25b allows the user to momentarily stop the cassette tape during any part of the audio instruction "program." Tape deck volume control 25c provides an independent volume adjustment for the cassette tape audio, as distinguished from the radio receiver audio and the signalling sidetone audio. Headphone jack 25d may be used for private instruction as required. When headphones are used, the speaker audio is muted. Scan speed switch 25e provides an opportunity for the user to slow the sequential channel scanning rate of the display LED's such that a more comprehensive understanding of channel scanning features (i.e., two-level priority) can be achieved. Control head selector switch 25f, a six-position rotary switch, permits the user to select one of the six radio control heads. When the cassette tape is used, the pre-recorded voice will tell the user precisely when to change to a specific control head, thereby correlating the pre-recorded instruction to each radio model. One of the six tape counter LED's 25g will normally be illuminated whenever the cassette tape is playing. This "electronic tape counter" informs the user as to which radio control head is being discussed, thus preventing operator confusion. During the manual mode, whereby the cassette tape is not being played, the tape counter LED's will not be lit. The user of the portable demonstrator then has the freedom to select any of the six control heads to demonstrate a particular radio model or specific option.

FIG. 3 identifies the specific operator controls on each of the six control heads 13. The heads are arranged in increasing order of complexity, with the simplest model being at the top. Although the six control heads 13 appear to be similar, each one embodies a different model or option configuration which must be rigorously described to furnish the salesman with a comprehensive understanding of radio flexibility. All radio controls appear totally functional to the user, through the use of actual radio circuitry or digital logic simulation. Control head no. 1 represents a basic carrier squelch model of the radio transceiver to be demonstrated. When this unit is selected by the control head selector switch 25f, the radio volume control 47 is used to adjust unsquelched receiver noise and signalling sidetones. Rotating the volume control completely counterclockwise turns control head no. 1 off. The channel selector switch 48 is used to change to a desired channel as indicated by the LED channel display 49. Transmit indicator light 51 is illuminated whenever the microphone push-to-talk (PTT) switch is pressed (when the microphone is out of its hand-up clip). Squelch disable switch 52 controls the radio carrier squelch operation by muting unquieted receiver noise (when the button is out) or by disabling the carrier squelch mute (when the button is depressed). The aforementioned operator controls represent the basic radio functions common to all six control heads. The singletone option provides control head no. 1 with the singletone call button 53. When this button is momentarily depressed, the transmit indicator LED illuminates and a sidetone is heard in the speaker.

Control head no. 2 represents the basic continuous tone controlled squelch system (CTCSS) model, introducing the channel busy LED 57, the CTCSS monitor switch 54, the selectable CTCSS display 55, and the selectable CTCSS button 56. These elements comprise the tone-coded squelch signalling controls that are fully functional.

Control head no. 3 introduces the basic six-mode channel scan controls and indicators which allow the operator to simulate channel scanning operation. When the scan-on switch 58 is depressed, the scan indicator LED 61 is illuminated, and the channel indicator display blanks to signify channel scanning operation. Scan-off switch 62 returns the radio to the non-scanning mode. The auxiliary control switch 59 performs additional channel increment and channel delete functions.

Control head no. 4 illustrates the six-mode channel scan option on a CTCSS radio model, and is primarily used to introduce the user to the concept of priority channel scanning. A variation of the channel scan option is shown on control head no. 5. This user-modifiable option allows the user to program individual channels to be scanned by means of the scan modify switch 63.

Control head no. 6 represents an extremely complex combination of features and options including user-modifiable scan with two-level priority in a tone-coded squelch radio model. The priority control switch 64 permits the user to alter his priority channels in addition to modifying his non-priority channel scanning sequence. Priority indicator LED's 65 assist the user in priority channel scanning operation.

These six control heads 13 are configured to represent a majority of the CTCSS and channel scanning options offered, although additional internal features and options have not been discussed herein. It should now be appreciated, by those skilled in the art and others, that there is an significant amount of information that must be effectively conveyed to the salesman or customer with respect to radio operation, features, options, and ordering procedures.

FIG. 4 shows the display panel 18 which is mounted in the upper portion of the suitcase 11 and connected to the lower portion via interconnect cables 26. A thin transparent plastic window 74, mounted on hinges 75, serves to hold the translucent order form 21 to the display panel. The pre-recorded voice (previously described) instructs the user to turn knobs 76 and tilt the plastic window away from the display panel to replace order forms. A plurality of order forms are provided with the portable demonstrator 10 to correspond to the six models of the control heads. Preferably, the order form itself is an enlarged version of the actual order form a salesman fills out when ordering a customer's radio. The left-most portion of the order form contains channel frequency information and CTCSS code information for twelve channels. (Only twelve of the thirty-two available channels are displayed.) The central portion of the order form contains channel scanning information, i.e., user-modifiable and six-mode channel scan assignments. The right-most portion contains ordering information for the channel scan, CTCSS, and time-out-timer options. This area is illuminated by yellow option display LED's 79 to direct the user's attention to a specific option location as determined by the cassette tape "program." The central portion is backlit with red scan display LED's 78 to represent which of the twelve channels is presently being received, in addition to green mode display LED's 73 to indicate which of the six scan modes is presently being utilized. Thus, a channel scan radio, when scanning, will typically have a vertical row of these scan display LED's 78 sequentially flashing to simulate scanning the received channels of the chosen mode. When the scan speed switch 25e (FIG. 2) is in the "normal" position, these flashing scan display LED's appear to be continuously on; hence, the "slow" scan speed position is available to reduce this sequential flashing rate for a more complete understanding of the scan process. If a user desires to stop the scan sequence on a particular channel, he simply presses a momentary active channel switch 22, whereby the corresponding channel display LED 72 illuminates. This simulates the presence of an RF carrier on a particular channel, which stops the channel scanner and unmutes the radio. During the automatic or "program" mode, inaudible tones on the pre-recorded cassette also control this channel activity, thus allowing a very effective means of automatically demonstrating the complex two-level priority scan option. Signalling display LED's 77, controlled by the radio signalling option circuitry, indicate which selectable CTCSS code has been chosen by the user. Hence, the display panel provides the user with the unique opportunity to visualize the intricate scanning process executed by the scan microcomputer, as well as to be informed of the specific signalling option ordering format.

Figure 5:
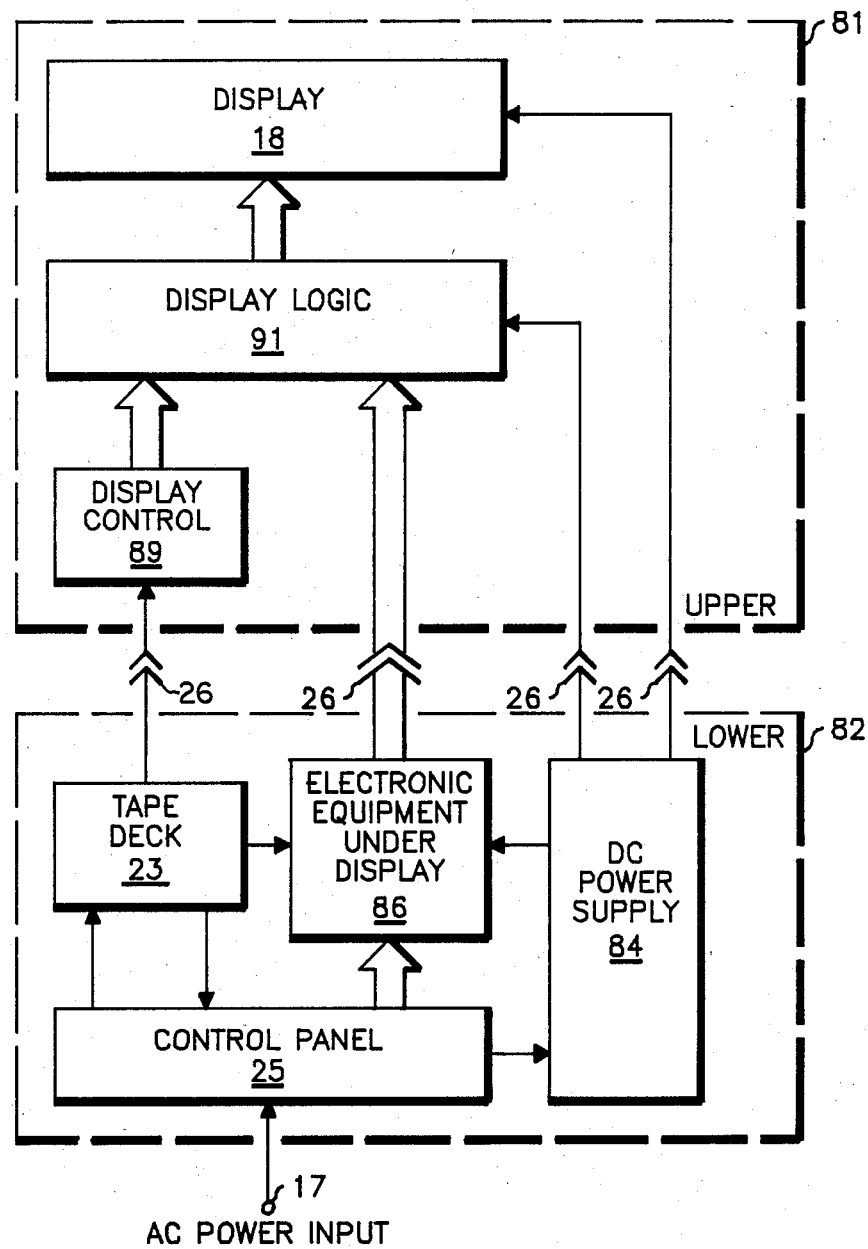
FIG. 5 is a simplified electrical block diagram of the embodiment of the present invention as shown in FIG. 1.

FIG. 5 represents a simplified block diagram 80 of the present invention as embodied by the portable demonstrator apparatus 10 of FIG. 1. The block diagram consists of an upper portion 81 representing the visual display and a lower portion 82 containing the remaining demonstrator components. An AC power input 17 is applied to the control panel 25 which supplies switched AC voltage to the DC power supply 84 and the tape deck 23. The DC power supply creates a low voltage source for the portable demonstrator components. The tape deck 23 provides audio voice instruction, tape counter tones, as well as display logic tones. Control panel 25 permits user interface with the portable demonstrator, specifically, electronic equipment selection and tape deck control features. Electronic equipment under display 86 represents one or more functional units of the equipment to be demonstrated, or representative portions thereof. For example, in the present embodiment, the equipment consists of six radio control heads 13 multiplexed by the control head selector switch 25f to one functional radio unit from which the transmitter, synthesizer, and receiver front end have been removed.

This RF circuitry is not required in the portable demonstrator since these functions are simulated by digital logic circuitry. Electronic equipment under display 86, located in the lower half, interfaces with the display via interconnect cables 26. Display control 89 serves to decode display logic tones from the tape deck and to interface the display to the user via the active channel switches 22. Display logic 91 interprets the signals received from electronic equipment 86 and display control 89 to provide information to display 18 in a format that can be readily understood by the user. In the present embodiment, the display 18 consists of the red, green, and yellow LED's which backlight the translucent order form.

Figure 7:
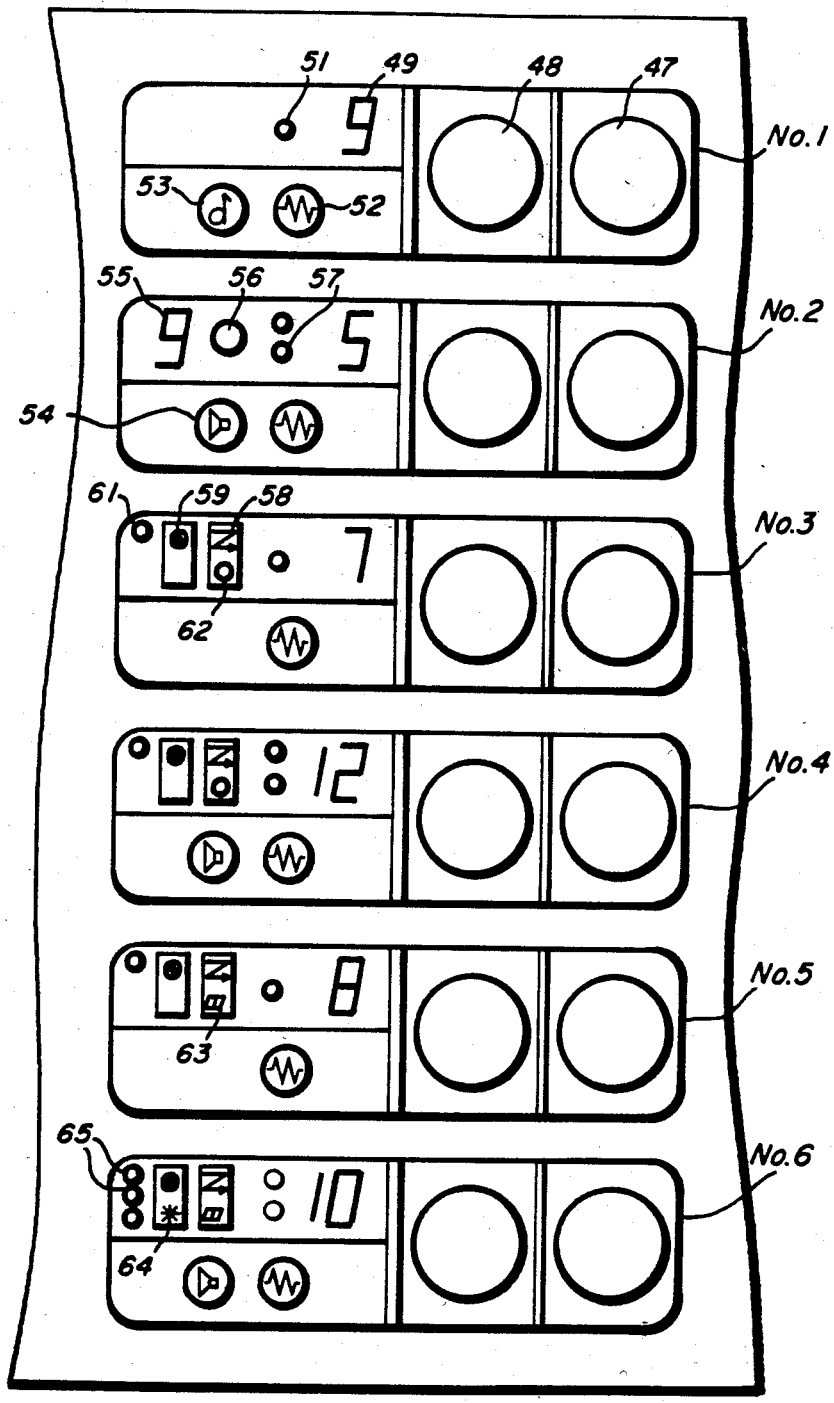
FIG. 7 is a detailed block diagram of the upper half of the portable demonstrator unit of the preferred embodiment of the present invention.

FIG. 6 is a detailed block diagram of the lower portion 82 of the preferred embodiment of the portable demonstrator apparatus 10, and FIG. 7 is the corresponding detailed block diagram of the upper portion 81. In combination, FIG. 6 and FIG. 7 represent the entire detailed block diagram information of the simplified block diagram 80 of FIG. 5. Referring to the detailed lower block diagram 100, voltage is applied to AC input 17 through AC switch 25a to DC power supply 84 which, in turn, supplies +12 volts DC to the radio circuitry, as well as to the interconnect and logic circuitry. Radio 104 contains actual radio circuit boards, such as audio 105, receiver 106, scan 107, and signalling 108, housed in a standard radio chassis. Schematics and circuit description of these circuit boards are available in the appropriate radio service manual. (Radio, Audio, Receiver, and Signalling in Motorola "MCX100" Radio Service Manual No. 68P81045E20; and Scan in Motorola "MCX100" Channel Scan Supplement No. 68P81047E45). Accordingly, only a brief functional description is deemed necessary.

Audio circuitry 105, contained on the radio main board, provides the necessary audio amplification for the tape deck, as well as for unsquelched receiver noise and signalling sidetones. Receiver circuitry 106 contains actual IF and squelch circuitry to generate receiver noise and interface to the scan circuitry for realistic channel scan simulation. Receiver quieting is simulated by logic control of the receiver audio gain. The majority of scan circuitry 107 is comprised of the scan microcomputer which has total control of the radio channel selection process when in the scan mode. Signalling circuitry 108 essentially consists of a signalling board which provides CTCSS coded squelch, single-tone signalling, and time-out-timer functions. PROM circuitry 109 contains six individually-programmed scan PROM's (such as, Motorola Part No. 51-80070C01), multiplexed to the scan microcomputer and selected by control head switch 25f, to facilitate demonstration of different scan options and scan mode configurations. Headphone jack 25d interrupts the portable demonstrator audio to speaker 16, thereby accommodating private listening. A standard radio microphone 14, with functioning PTT and hang-up switches, is also connected to the radio chassis.

Tape deck 23 provides voice and music through audio circuitry 105 to speaker 16. The tape deck also provides display control tones to the display logic circuitry in the upper half, as well as tape counter tones to tape decoder 117 as displayed by tape counter LED's 25g. Display control tones may be of any appropriate type which permit control of the required number of display indicators, and tape counter tones may be of any appropriate type which permit display of the desired number of cassette tape sections. In the present embodiment, the tone format on cassette tape track two is comprised of momentary bursts of three simultaneous "Touch-Tone" frequencies (for display control) over a fourth continuous tone (for tape counter control). The three-tone burst is decoded in the upper half of the portable demonstrator to perform thirty-two different display control functions. The continuous tape counter tones are decoded in tape decoder 117, consisting of six general purpose tone decoders, such as Signetics type NE567, operating in parallel to control the tape counter LED's 25g. One of these six tape counter tones is present on track two of the cassette tape whenever one of the six heads is being discussed by the audio voice instruction (previously described). The function of tape deck pause switch 25b and tape deck volume control 25c, which are located on the control panel 25, have previously been explained.

Motherboard 121 furnishes the necessary interconnections to multiplex the six control heads (head No. 1 through head No. 6), via control head selector switch 25f, to radio 104. The control head selector switch 25f, a four-pole six-position rotary switch, applies A+ and ground to each control head individually, as well as to one of the six scan PROM's 109. Motherboard 121, primarily consists of a multitude of connectors, which serve to distribute the appropriate voltages and signals throughout the portable demonstrator 10. It will be appreciated, by those skilled in the art, that these motherboard interconnections are specific to the actual type of electronic equipment being displayed (a radio control head in this instance). Therefore, a further detailed explanation of the specific motherboard circuitry is not deemed pertinent since the present embodiment is only one of many alternatives.

Referring now to the detailed upper block diagram 130 of FIG. 7, interconnect cables 26 link the upper half of the demonstrator to the lower half. Interconnect matrix 132 serves two functions: first, it contains six mode PROM's (i.e., Signetics type 82S123) to decode channel address information (binary) into scan display mode information (one of six scan modes) for each of the six control heads; secondly, it provides a wire jumper matrix for various option configurations which increase the versatility of the portable demonstrator. Again, it is well known to those skilled in the art that this scan mode display information is inherently specific to the Motorola "MCX100" six-mode channel scan model. Accordingly, a further detailed description is not deemed necessary because the actual circuitry would be different in another radio-type application.

Tone decoder 135 interfaces the inaudible display control tone information to the display 18. In the present embodiment, the three-tone burst of display control tones, pre-recorded on track two of the cassette tape, is decoded and demultiplexed by tone decoder 135 using the standard "Touch-Tone decoder" application of a general purpose tone decoder (such as, Signetics type NE567) to provide one of thirty-two outputs for the yellow option display LEDs 79 and active channel latches 134. These active channel latches 134 illuminate the green channel display LEDs 72 in response to either a manual user-controlled signal from one of the twelve active channel switches 22 or an automatic pre-recorded tape-controlled signal from tone decoder 135. The active channel latches 134 consist of twelve NAND gates (for example, Motorola type MC14011B), which "OR" these two input signals, and twelve D-type flip-flops (such as Motorola type MC14013B) which latch the active channel output. The binary coded channel address lines from the scan microcomputer are decoded by address decoder 138 (i.e. Motorola type MC14514B four-bit latch/4-to-16 line decoder), to facilitate channel scanning simulation by the red scan display LEDs 78. The scan detect gate 137 (for example, Motorola type MC14011B NAND gates with outputs diode "OR'd") accepts this decoded address information, as well as active channel information, to provide a signal to the scan microcomputer to stop scanning when an active channel is reached.

Mode latch 144 (such as Motorola type MC14042B quad latch), which controls the green mode display LEDs 73, presents the user with a supplementary understanding of the particular mode arrangement of the six-mode channel scan option. Signalling decoder 146 (i.e. Motorola type MC14028B BCD-to-Decimal Decoder) provides information to the red signalling display LEDs 77 by decoding the signalling address lines from the signalling options circuitry 108. Signalling mute gate 145 (a 12 channel×6 control head diode matrix) simultaneously monitors the decoded channel address lines and the decoded signalling address lines to create a simulated signalling mute signal to control the receiver audio; thereby duplicating the function of RF channel reception with valid signalling code detection. Thus, even though the radio is not actually receiving an RF signal, all receiver functions (receiver quieting, tone-coded signalling detection, channel scan activity, etc.) appear to be fully operational to the user.

It is well known to those skilled in the art that the particular implementation of the digital logic hardware, electronic equipment interconnections, or other component-level circuitry is specific to this particular radio transceiver embodiment of the present invention, and hence, a further detailed description of the particularized component-level circuitry is not deemed necessary.

In summary, a portable audio-visual demonstration apparatus has been disclosed for providing operational instruction and functional simulation of particularized electronic equipment for training and exhibition purposes. The preferred embodiment of the present invention is the application of the device to communications equipment such as an FM two-way mobile radio, but it will be apparent that the invention is not inherently limited to the communications environment. Accordingly, the appended claims are intended to cover all modifications and alternative variations that fall within the true scope and spirit of the invention.

What is claimed is:

1. A portable hand-carried audio-visual demonstration apparatus for simulating the operation of particularized radio communications equipment, said demonstration apparatus comprising in combination:

means for controlling at least one representative portion of said radio communications equipment to be demonstrated;

visual display means, coupled to said communications equipment control means, and including selected indicators for displaying the simulated operation of said communications equipment in response to the manipulation of said control means;

portable housing means for containing said communications equipment control means with said display means; and audio reproduction means for providing pre-recorded voice instruction in the simulated operation of said communications equipment, whereby said voice instruction directs operator manipulation of said control means which, in turn, effects a corresponding operational and visual response in said display means.

2. The portable demonstration apparatus as described in claim 1 wherein said radio communications equipment control means includes a plurality of representative portions of said radio communications equipment capable of demonstrating various optional configurations of said radio communications equipment.

3. The portable demonstration apparatus as described in claim 2 wherein said optional configurations of said radio communications equipment includes channel scanning means.

4. The portable demonstration apparatus as described in claim 3, wherein said visual display means includes operator display switches for permitting manual control of the visual display simulation of said channel scanning means.

5. The portable demonstration apparatus as described in claim 1, wherein said visual display means further comprises:
  a display panel for providing support for said visual display means;
  light emitting diodes as selected indicators affixed to said display panel for displaying the simulated operation of said radio communications equipment; and
  an overlying translucent sheet affixed to said display panel, through which said light emitting diode indicators illuminate, for providing a specific display format for said visual display means.

6. The portable demonstration apparatus as described in claim 5, wherein said visual display means includes a plurality of said overlying translucent sheets, each of which corresponds to a particular optional configuration of said radio communication equipment.

7. The portable demonstration apparatus as described in claim 1, wherein said audio reproduction means further comprises:
  a cassette tape deck for providing audio reproduction; and
  a cassette tape in which voice instruction has been pre-recorded thereon.

8. The portable demonstration apparatus as described in claim 7 wherein said audio reproduction means further includes electronic tape counter means for decoding and displaying tape counter information which is pre-recorded on said cassette tape, thereby permitting operator to locate a specific portion of said cassette tape.

9. The portable demonstration apparatus as described in claim 7, wherein said audio reproduction means includes display control means for decoding and displaying display control information which has been pre-recorded on said cassette tape, thereby permitting cassette tape control of said visual display means.

10. The portable demonstration apparatus as described in claim 1, wherein said portable housing means is a suitcase.

11. The portable demonstration apparatus as described in claim 1, wherein said portable housing means further contains a cassette tape deck with a power supply requiring an AC voltage input.

12. A portable hand-carried audio-visual demonstration apparatus for simulating the operation of particularized radio communications equipment, said demonstration apparatus comprising in combination:
  means for controlling at least one representative portion of said radio communications equipment to be demonstrated;
  a visual display panel, including light emitting diode indicators coupled to said radio communications equipment control means, for displaying the simulated operation of said radio communications equipment in response to the manipulation of said control means;
  a cassette tape deck for providing pre-recorded voice instruction in the simulated operation of said radio communications equipment; and
  a portable suitcase for containing said radio communications equipment control means with said visual display panel with said cassette tape deck;
  whereby said voice instruction directs operator manipulation of said control means which, in turn, effects a corresponding operational and visual response in said visual display panel thereby demonstrating functional capability and operational characteristics of said radio communications equipment.

13. The portable demonstration apparatus as described in claim 12, wherein said radio communications equipment includes channel scanning means of which the simulated operation is displayed by said light emitting diode indicators coupled to said radio communications equipment control means.

14. The portable demonstration apparatus as described in claim 12, wherein said visual display panel includes a plurality of overlying translucent sheets, through which said light emitting diode indicators illuminate, for providing a specific display format for said visual display panel.

15. A portable hand-carried, audio-visual demonstration apparatus for simulating the operation of particularized radio communications equipment, said demonstration apparatus comprising in combination:
  a plurality of representative portions of said radio communications equipment including control means for demonstrating function and capability of said equipment;
  control panel means for permitting operator selection of one of said plurality of equipment control means;
  power supply means for providing low voltage DC to said equipment control means;
  audio reproduction means for providing pre-recorded voice instruction in the simulated operation of said equipment;
  visual display means, including light emitting diode indicators coupled to said equipment control means, for displaying the simulated operation of said equipment in response to the manipulation of said control means as directed by said pre-recorded voice instruction; and
  portable housing means for containing above-stated elements of said demonstration apparatus into a portable hand-carried unit.

* * * * *